United States Patent [19]

Johnson et al.

[11] Patent Number: 4,479,745
[45] Date of Patent: Oct. 30, 1984

[54] HOBBING MACHINE

[75] Inventors: Stuart J. Johnson; George E. Fransson, both of Rockford, Ill.

[73] Assignee: Barber-Colman Company, Rockford, Ill.

[21] Appl. No.: 375,578

[22] Filed: May 6, 1982

[51] Int. Cl.³ .............................................. B23F 5/22
[52] U.S. Cl. ....................................... 409/12; 409/18; 409/23
[58] Field of Search ........................ 409/11, 12, 14, 15, 409/17, 18, 19, 20, 21, 22, 23, 24; 408/130

[56] References Cited

U.S. PATENT DOCUMENTS

| Re. 15,912 | 9/1924 | Herrmann | 409/18 |
|---|---|---|---|
| 219,892 | 9/1879 | Albro | 409/23 |
| 405,030 | 6/1889 | Grant | 409/19 |
| 1,714,109 | 5/1929 | Schurr | 409/22 |
| 1,867,782 | 7/1932 | Trbojevich | 409/12 |
| 1,879,196 | 9/1932 | Greene | 409/23 X |
| 2,287,559 | 6/1942 | Nye | 408/130 X |
| 2,906,178 | 9/1959 | Cotta | 409/14 |

Primary Examiner—Z. R. Bilinsky
Attorney, Agent, or Firm—Leydig, Voit, Osann, Mayer & Holt, Ltd.

[57] ABSTRACT

The hobbing machine is of simplified construction and is dedicated essentially to forming only a single type of gear or a narrow range of gears. To enable the machine to be of simplified construction, its drive train consists of only four gears and its hob head is mounted to pivot around the axis of the drive shaft for the work spindle. The arrangement of the four gears together with the pivotal movement of the hob head enables the hob spindle to be inclined at a predetermined setting angle relative to the work spindle and enables the center distance between the spindles to be selectively changed.

18 Claims, 12 Drawing Figures

HOBBING MACHINE

BACKGROUND OF THE INVENTION

This invention relates to a hobbing machine of the type in which a hob on a rotatable hob spindle is rotated in precisely timed relation with a gear blank on a rotatable work spindle in order to form gear teeth around the periphery of the gear blank. Under very specialized circumstances, the axis of the hob spindle may extend perpendicular to the axis of the work spindle. In most instances, however, the hob spindle is inclined relative to the work spindle at a predetermined setting angle which is other than a right angle. The setting angle is determined as a function of the thread angle of the particular hob being used and, in cases where a helical gear is being formed, the setting angle is also a function of the helix angle of the gear.

In virtually every hobbing machine, it is necessary to be able to adjust the center-to-center distance between the axis of the hob spindle and the axis of the work spindle while maintaining the same setting angle. Adjustment of the center distance is necessary, for example, to enable a gear blank to be loaded onto or unloaded from the work spindle, to enable the depth of cut of the hob into the work to be established and/or to enable the hob to be brought into proper working relationship with the work after the hob has been re-sharpened and reduced in diameter.

Most hobbing machines which presently are in commercial use are so-called universal hobbing machines. That is, the hobbing machine is adapted to be used with several different hobs and is adapted to be changed over to enable the formation of many different types and sizes of gears. While a universal hobbing machine is extremely versatile, that very versatility causes the overall construction of the machine to be both complex and expensive. Most universal machines include adjustable hob and work slides, an adjustable hob swivel and other adjustable components and also include a complex drive train with several sets of change gears for driving the hob and work spindles in various timed relationships. The complexity and expense of a universal machine are of little value to a gear manufacturer who wishes to make only a single type of gear or a very narrow range of gears. Moreover, the various adjustment capabilities which are present in a universal machine tend to introduce a lack of stiffness and precision into the drives for the spindles, several disadvantages resulting therefrom.

SUMMARY OF THE INVENTION

The general aim of the present invention is to provide a new and improved hobbing machine which is dedicated to forming only a single type of gear or a very narrow range of gears and which is characterized particularly in that it is simpler and less expensive than prior commercially available hobbing machines while also being more rigid, more compact and more trouble-free than such prior machines.

A further object is to provide a simplified hobbing machine whose drive train for the hob and work spindles consists essentially of only four gears which are uniquely arranged to enable the hob setting angle to be established while also permitting the center distance between the spindles to be adjusted in a novel manner.

A more detailed object is to provide a hobbing machine in which one of the spindles, preferably the hob spindle, is pivotally mounted to enable the center distance between the spindles to be adjusted. During such adjustment, the hob spindle pivots about the drive shaft for the work spindle with one of the gears of the four-gear set uniquely walking around another one of the gears to permit pivoting of the hob spindle.

The invention also resides in the unique relationship of the other two gears of the set to enable the setting angle to be established while maintaining a very rigid and precise drive to the hob and work spindles.

These and other objects and advantages of the invention will become more apparent from the following detailed description when taken in conjunction with the accompanying drawings.

DETAILED DESCRIPTION OF THE PREFERRED EMBODIMENTS

As shown in the drawings for purposes of illustration, the invention is embodied in a hobbing machine 20 for forming gear teeth around the periphery of a cylindrical work blank or gear blank 21. The machine includes a conventional hob 22 secured to and coaxial with a rotatable hob spindle 23, the latter extending transversely of a rotatable work spindle 24 for holding the gear blank. In this particular instance, the work spindle is disposed in a vertical position.

During a typical hobbing operation, the hob 22 and the gear blank 21 are rotated in timed relation with each other about their respective axes 25 and 26 (FIG. 5) and, at the same time, the hob and the blank are fed relative to one another along the axis of the blank. Herein, the axial feed is accomplished by bodily shifting the rotating gear blank upwardly along its axis 26 and past the rotating hob while keeping the hob in a vertically fixed position. The timed rotation and relative feeding of the hob and the gear blank cause the hob to generate angularly spaced gear teeth around the periphery of the blank in a well known manner.

With the present machine 20, as is the case with many hobbing machines, the hob 22 is adapted to be shifted periodically along its axis 25. The effective length of the hob is significantly greater than is needed to form the gear teeth on the work blank 21 and thus only a relatively short lengthwise section of the hob performs the actual cutting function during a given hobbing operation. When that section becomes worn, the hob is shifted axially to bring a fresh section of the hob into active cutting relation with the work blank.

In most cases, the axis 25 of the hob 22 and the hob spindle 23 is not disposed perpendicular to the axis 26 of the work blank 21 and the work spindle 24 but instead is inclined relative to the latter axis at a predetermined setting angle W (FIG. 5) which is other than a right angle. In customary terms in the hobbing art, the setting angle is usually referred to as being the angle X between the hob axis 25 and a horizontal line. As a matter of convenience, however, the acute angle W between the hob axis 25 and the work axis 26 has herein been designated as being the setting angle, the angle W being the complement of the angle X. When hobbing a given gear, the setting angle W remains constant during the hobbing operation and is determined as a function of the thread angle of the hob 22. If the gear to be formed is a helical gear, the setting angle W also is determined as a function of the helix angle of the gear. Under very special circumstances, the hob axis 25 may extend perpendicular to the work axis 26 in which case the setting angle W is ninety degrees. While the present machine 20 can be designed to operate with a setting angle of ninety degrees, it is contemplated that most practical applications of the machine will involve a setting angle of other than ninety degrees as has been illustrated in the drawings.

It is necessary to be able to adjust the center distance Y between the axes 25 and 26 to establish the depth of cut of the hob into the work. When the hob wears and is subsequently re-sharpened, it is necessary to reduce the center distance y in order to compensate for the reduced diameter of the hob while still maintaining the same depth of cut. It also is desirable to be able to increase the center distance to facilitate loading of the work 21 onto or unloading of the work from the work spindle 24. In this particular instance, a change in the center distance Y between the axes 25 and 26 is effected by moving the hob toward or away from the work.

Most hobbing machines which are presently being marketed are of the "universal" type in that the machines are capable of being changed over to form several different types and sizes of gears. In addition to possessing the adjustment and drive capabilities necessary for a basic hobbing operation, a univeral hobbing machine includes other adjustment features and includes an elaborate drive train with several sets of change gears to enable the hob and work spindles to be rotated at various relative rates. As a result, universal machines are large, complex and expensive and, in some cases, incorporate versatility only at the sacrifice of rigidity and preciseness.

The present invention contemplates the provision of a new and improved hobbing machine 20 which is dedicated essentially to forming only a single type and size of gear and which is characterized particularly by (a) the simplicity and rigidity of its drive train and (b) the novel manner in which the drive train coacts with the hob and work spindles 23 and 24 to effect establishment of the setting angle W and to enable adjustment of the center distance Y. As will become more apparent subsequently, the "dedicated" hobbing machine 20 of the present invention is simpler and less expensive and is more compact, precise and trouble-free than prior universal machines and thus offers significant advantages to gear manufacturers whose basic aim is to form only a single type of gear or closely similar gears within a narrow range of gears.

Figure 1:
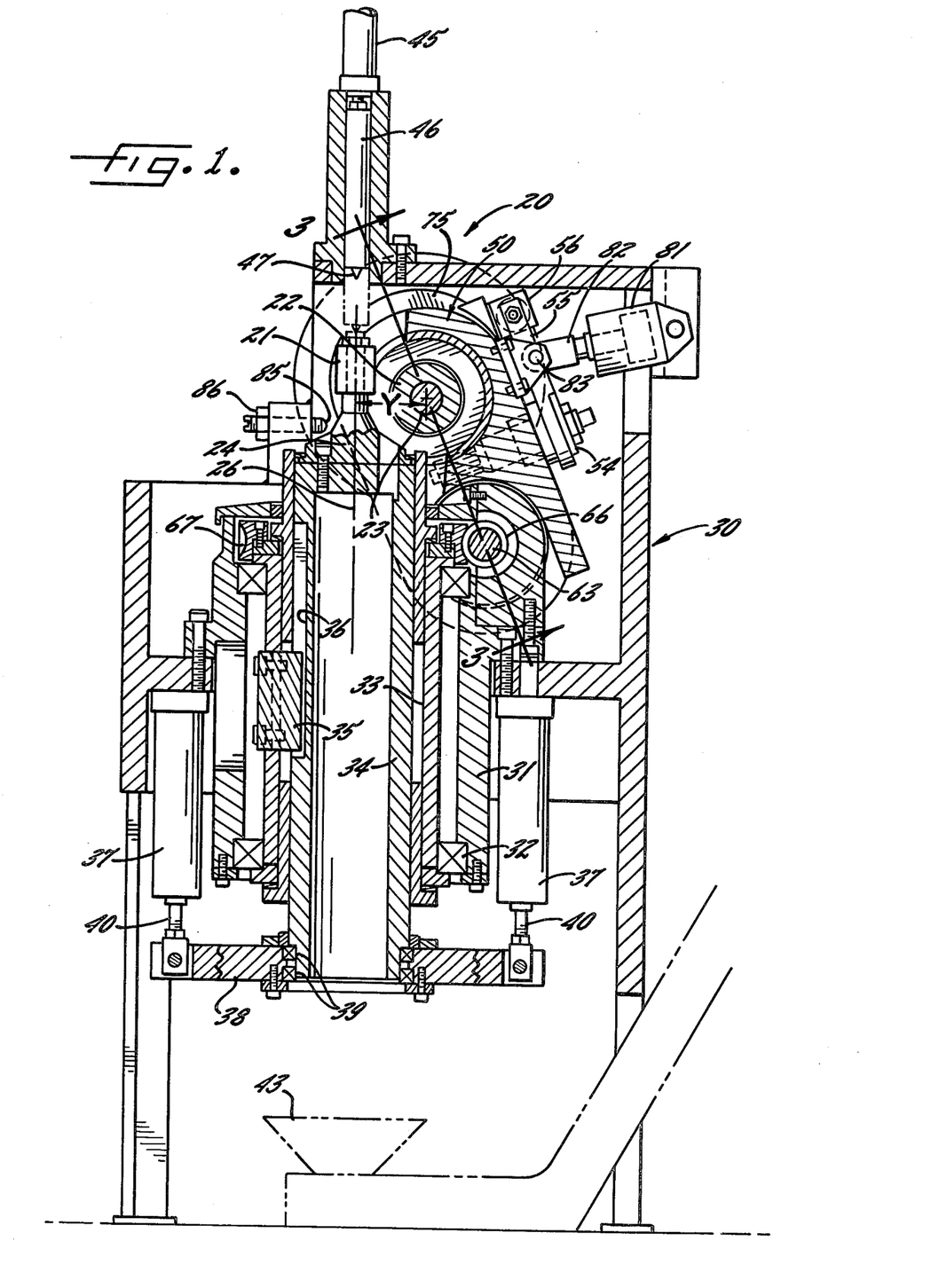
FIG. 1 is a fragmentary cross-section taken transversely through one embodiment of a new and improved hobbing machine incorporating the unique features of the present invention.

More specifically, the machine 20 includes a main frame or base 30 which supports an upright bearing housing 31 (FIG. 1). Rotatably mounted in the housing by a pair of vertically spaced bearings 32 is a vertically extending sleeve 33. The latter slidably supports a vertical quill 34 whose upper end is rigidly connected to the work spindle 24. A key 35 secured to the sleeve 33 extends into a vertically elongated keyway 36 in the quill to couple the quill and the work spindle for rotation in unison with the sleeve while enabling the quill and the work spindle to shift upwardly and downwardly relative to the sleeve to permit axial feeding of the work blank 21. To effect such feeding, a pair of reciprocating fluid-operated actuators 37 are connected between the frame 30 and a plate 38 which is mounted on the lower end of the quill 34 by bearings 39. When the rods 40 of the actuators are extended, the work blank 21 is located below the periphery of the hob 22 as shown in solid lines in FIG. 2. As the rods are retracted, the work blank is shifted upwardly past the hob with the gear teeth being completely formed when the work blank reaches the position shown in phantom lines in FIG. 2. When the finished gear is in that position, it may be unloaded from the work spindle 24 and a new blank may be loaded onto the spindle (see FIG. 1).

An opening 42 (FIG. 2) is formed in the upper end of the quill 34 beneath the hob and communicates with the interior of the quill so that chips which are formed during the hobbing operation may fall through the quill and into a catch tray 43 located beneath the quill.

Supported on the frame 30 above the work spindle 24 is a reciprocating fluid-operated actuator 45 (FIG. 1) which is operable to advance and retract a rod 46 having a conical centering point 47 on its lower end. When the rod is retracted as shown in FIG. 1, the centering point is spaced above the upper end of the work spindle 24 to enable the work blank 21 to be loaded onto and unloaded from the spindle. After the work blank has been loaded, the rod 46 is advanced downwardly to cause the centering point to seat in the upper end of the work spindle for the purpose of stabilizing the spindle during the hobbing operation.

The hob spindle 23 is journaled by bearings 48 (FIG. 3) which are supported within a quill 49, the latter being mounted for axial sliding within a head 50. To effect axial shifting of the hob 22, a rack 51 (FIGS. 3 and 4) is formed on the lower side of the quill and meshes with a rotatable pinion 52. The pinion is carried on one end of a shaft 53 (FIG. 4) which is journaled in the head 50. A one-way clutch 54 is mounted on the other end of the shaft 53 and acts to rotate the shaft and the pinion when an arm 55 which is connected to the input of the clutch is rocked in one direction by a reciprocating fluid-operated actuator 56. As the pinion 52 rotates, it coacts with the rack 51 to shift the quill 49, the hob spindle 23 and the hob 22 in an axial direction for the purpose of bringing a different section of the hob into cutting relation with the work blank 21. The action of the clutch 54 may be selectively reversed to enable the pinion to be rotated in the opposite direction so that the hob may be shifted axially back to its starting position.

In carrying out the invention, the hob and work spindles 23 and 24 are rotated in timed relation by a relatively simple and inexpensive drive mechanism 60 (FIG. 5) which enables the setting angle W to be established while permitting the center distance Y to be adjusted in a unique manner. In the present instance, the drive mechanism includes a motor 61 (FIG. 5), either electric or hydraulic, which is connected by a timing belt 62 to a shaft 63 for rotating the work spindle 24, the shaft being journaled in bearings 64 (FIG. 3) in the frame 30. Pursuant to the invention, the axis 65 (FIG. 5) of the shaft 63 is inclined relative to the axis 26 of the work spindle 24 at an angle Z which is equal to the setting angle W of the hob. To enable the inclined shaft 63 to rotate the vertical work spindle 24, a worm 66 (FIGS. 3 and 5) is secured to and is coaxial with the shaft 63 and meshes with a worm wheel 67 which is secured rigidly to and is coaxial with the sleeve 33. The worm and the worm wheel are of special design to enable the inclined worm to turn the worm wheel, the sleeve 33, the quill 34 and the work spindle 24 when the shaft 63 is rotated.

In order to rotate the hob 22, an elongated pinion 70 (FIG. 5) is secured to the shaft 63 and meshes with a bull gear 71 on a shaft 72. The shaft 72 is alined axially with and is connected rigidly to the hob spindle 23, is journaled by bearings 73 in the head 50 and, in keeping with the invention, extends parallel to the shaft 63. As a result, the axis 25 of the hob 22 is inclined relative to the axis 26 of the work blank 21 at the setting angle W required for the particular gear which the machine 20 is designed to form.

Figure 5:
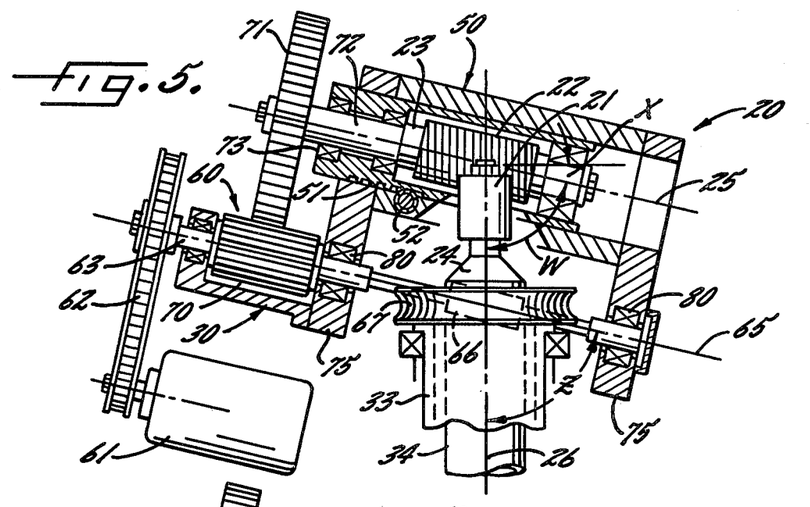
FIG. 5 is a schematic view of the hobbing machine shown in FIGS. 1 to 4.

Because the pinion 70 is elongated, the bull gear 71 may slide axially along the pinion when the hob 22, the spindle 23, the shaft 72 and the other element carried by the quill 49 are shifted by the pinion 52.

Figure 3:
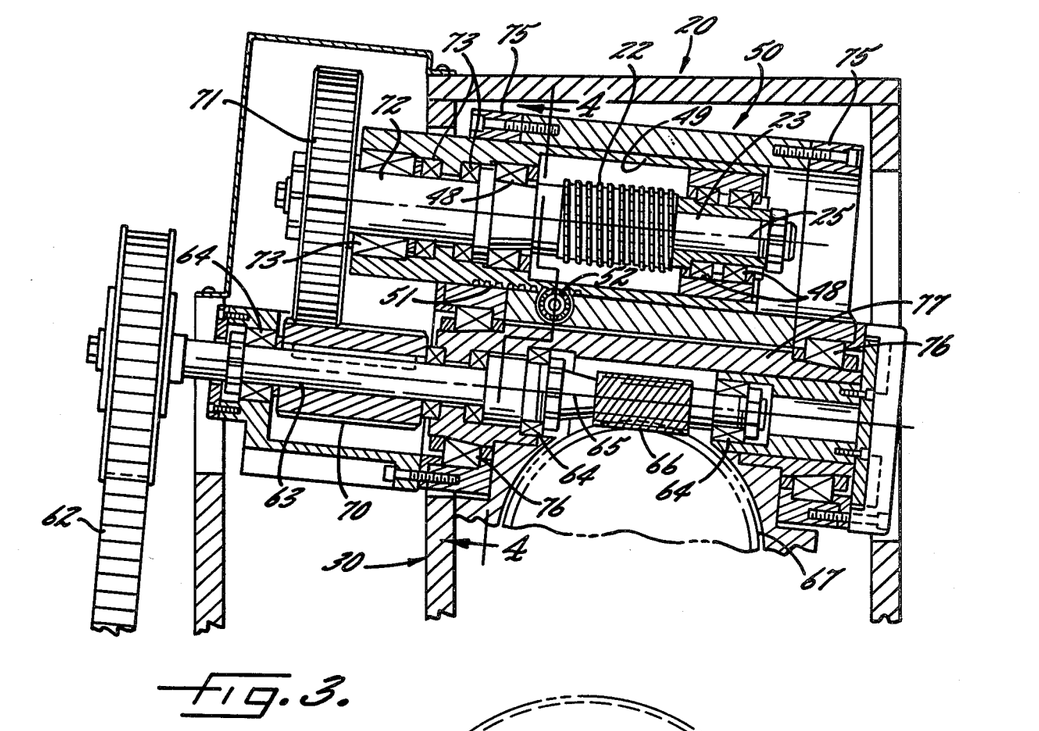
FIG. 3 is a fragmentary cross-section taken substantially along the line 3—3 of FIG. 1.
Figure 4:
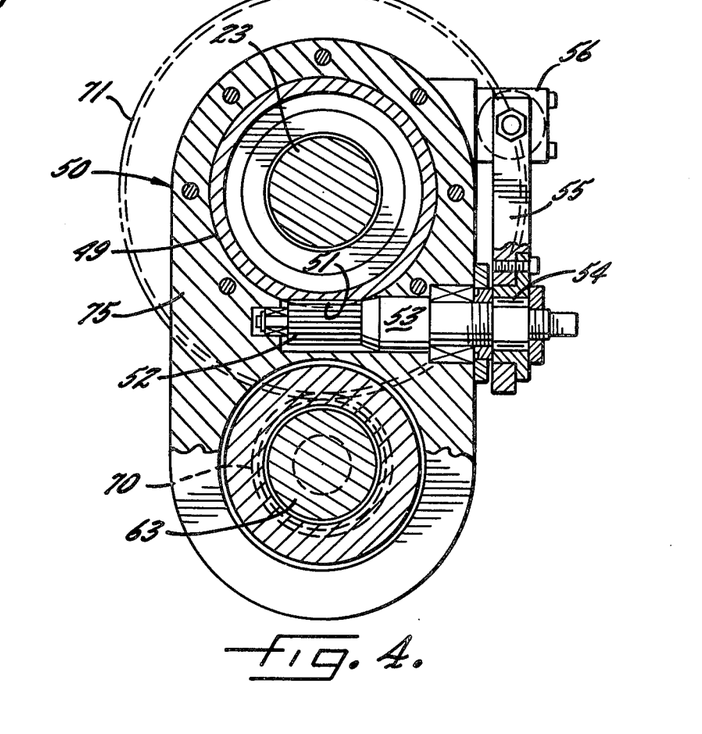
FIG. 4 is an enlarged cross-section taken substantially along the line 4—4 of FIG. 3.

Further in carrying out the invention, the hob head 50 is adapted to be selectively pivoted about the axis of the drive shaft 63 in order to enable the center distance Y to be changed. For this purpose, the hob head includes two elongated arms 75 (FIGS. 4 and 5) which are journaled on bearings 76 (FIG. 3). The bearings 76 are coaxial with the drive shaft 63 and are supported on a sleeve 77 which is rigid with the frame 30 and which also serves as a housing for four of the bearings 64. For purposes of simplicity, the bearings 64 and the bearings 76 have been collectively indicated by the common reference numeral 80 in the schematic view which is shown in FIG. 5.

To effect swinging of the hob head 50 and the hob 22 about the axis 65 of the drive shaft 63 in order to change the center distance Y, a reciprocating fluid-operated actuator 81 (FIG. 1) is connected to the frame 30 and includes a rod 82 which is connected pivotally to the hob head at 83. When the rod 82 is retracted, the hob head 50 and the hob 22 are swung clockwise about the axis of the shaft 63 from the position shown in FIG. 2 to the position shown in FIG. 1 to swing the hob away from the work blank 21 and thereby increase the center distance Y to provide sufficient clearance between the hob and the work blank to enable the latter to be loaded onto or unloaded from the work spindle 24 (see FIG. 1). Importantly, the bull gear 71 walks around the pinion 70 as the hob head is pivoted and thus permits such pivoting while still maintaining an operable drive between the shafts 63 and 72.

Figure 2:
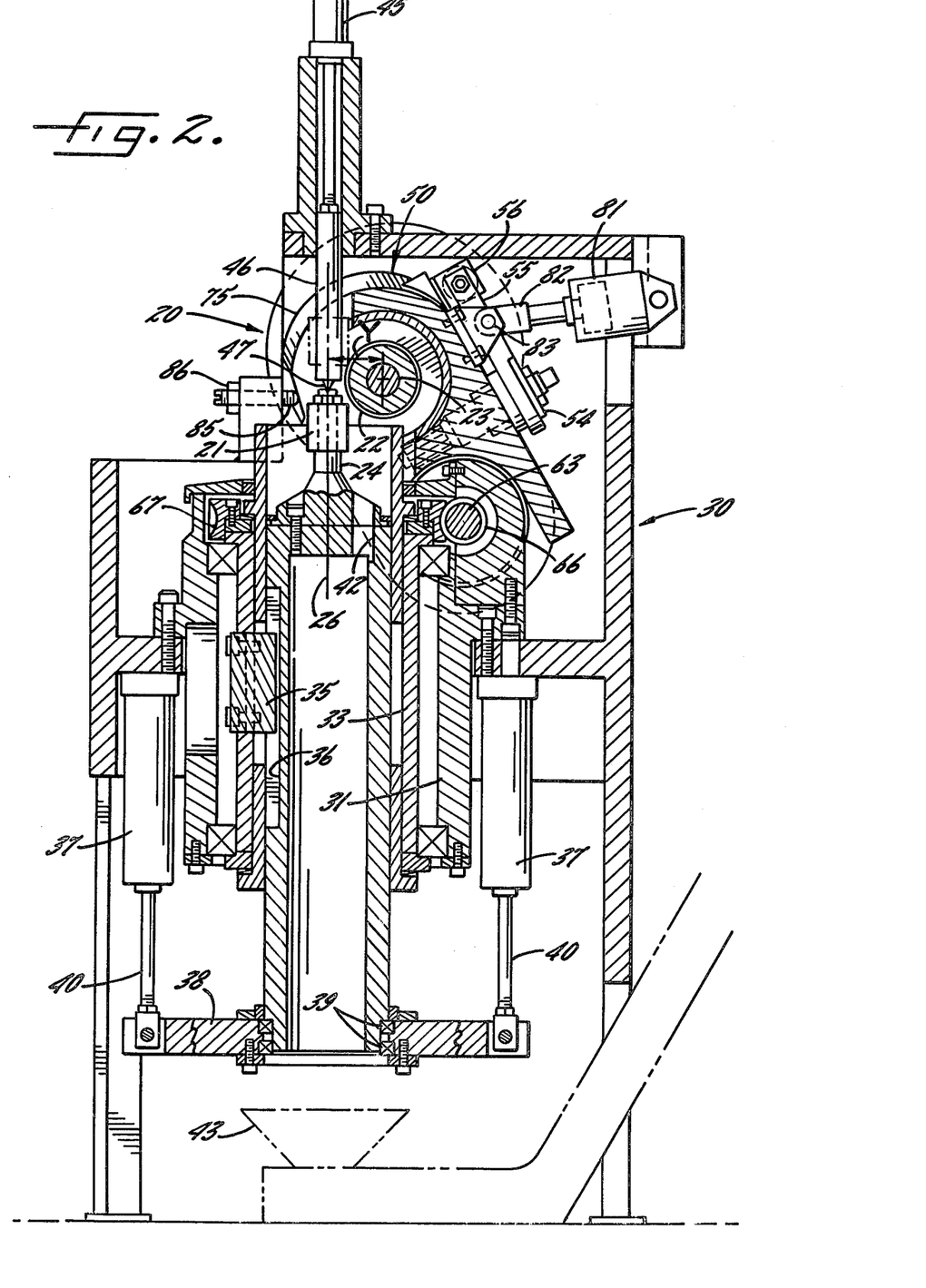
FIG. 2 is a view similar to FIG. 1 but shows certain parts of the machine in moved positions.

When the rod 82 of the actuator 81 is extended, the hob head 50 is swung counterclockwise about the axis 65 of the drive shaft 63 from the position shown in FIG. 1 to FIG. 2 in order to bring the hob 22 into operative cutting relation with the work blank 21. An adjustable stop in the form of a screw 85 (FIG. 2) is threaded into the frame 30 and is held in place by a lock nut 86. The inner end of the screw 85 engages the head 50 and establishes the operative cutting position of the hob 22. By adjusting the screw outwardly, the center distance Y which exists when the hob is in its cutting position can be reduced so as to enable a hob which has been re-sharpened and reduced in effective diameter to be located in proper cutting position relative to the work blank 21. Again, the bull gear 71 walks around the pinion 70 when the hob head is swung counterclockwise and maintains a drive from the shaft 63 to the shaft 72 in all adjusted positions of the head.

From the foregoing, it will be apparent that the present invention brings to the art a new and improved hobbing machine 20 which is of very simple construction. The drive mechanism 60 includes only four gears 66, 67, 70 and 71 with only two intermeshing sets of teeth. The drive to the spindles 23 and 24 is very stiff and rigid and thus the spindles are rotated in precisely timed relation. The stiff drive enables the use of high performance hobs and permits a high metal removal rate to be achieved. The drive motor 61 is located in a preferred position near the axis 25 of the hob 22 and indeed could be connected directly to the drive shaft 72. This, however, would require that the motor be supported to pivot with the hob head 50 and would lose the benefit of the torque step-up provided by the gears 70 and 71, the torque requirements of the hob spindle 23 being greater than those of the work spindle 24.

In addition to being of simple and relatively low cost construction, the machine 20 is comparatively compact and occupies less floor space than a universal hobbing machine. Moreover, the present machine includes fewer parts and requires less maintenance than a universal machine. While the machine 20, once constructed, is limited to the type of gears which may be formed, this is of no concern to gear manufacturers whose requirements do not extend to a wide range of gears.

Figure 6:
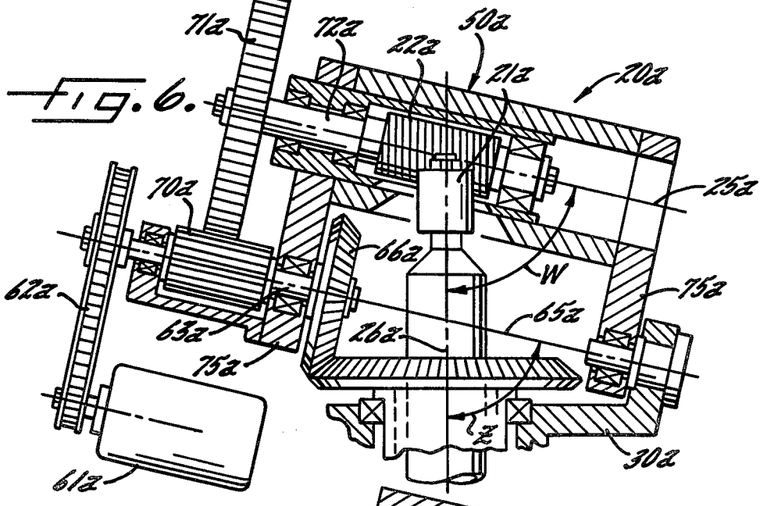
FIG. 6 is a view similar to FIG. 5 but shows a second embodiment of a hobbing machine incorporating the features of the invention.

Another embodiment of a hobbing machine 20a incorporating the features of the invention is shown schematically in FIG. 6 in which parts corresponding to those of the first embodiment are indicated by the same reference numerals but with the reference numerals having a suffix "a". The machine 20a is substantially identical to the machine 20 except that a coacting pair of bevel gears 66a and 67a are used in place of the worm 66 and the worm wheel 67, respectively. The axis 65a of the gear 66a is inclined relative to the axis 26a of the gear 67a at an acute angle Z which is equal to the setting angle W so as to enable the setting angle to be established while maintaining a parallel relationship between the shafts 63a and 72a. The bevel gears 66a and 67a avoid the need for using a specially formed worm 66 and worm wheel 67 but provide somewhat less stiffness than the worm and worm wheel drive.

Figure 7:
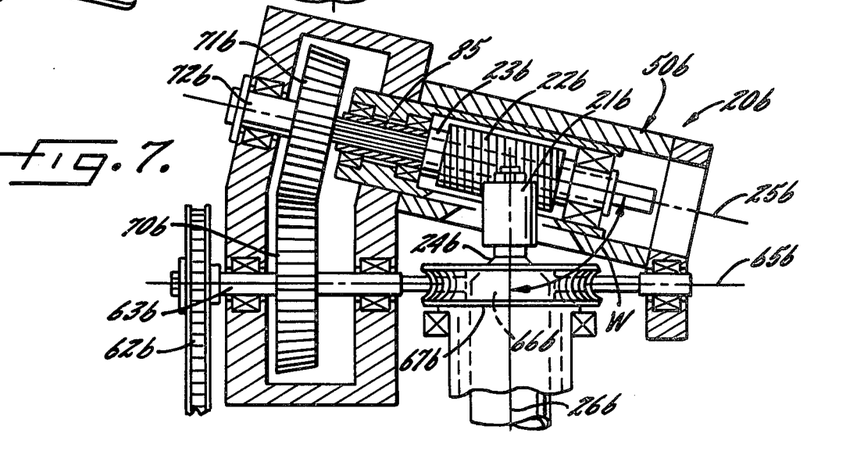
FIG. 7 is a view similar to FIG. 5 but shows a third embodiment of a hobbing machine of the invention.

A third machine 20b is schematically illustrated in FIG. 7. In this instance, the axis of the shaft 72b is inclined relative to the axis 26b of the work spindle 24b at the desired setting angle W but the shaft 63b extends perpendicular to the work spindle. A conventional worm 66b and worm wheel 67b are coaxial with the shaft 63b and the work spindle 24b, respectively, to transmit rotation from the shaft to the spindle. To enable the hob head 50 to pivot about the axis 65b of the shaft 63b even though the shafts 63b and 72b are not parallel, the pinion 70 and the bull gear 71 of the machine 20 are replaced with a set of bevel gears 70b and 71b which are coaxial with the shafts 63b and 72b, respectively, the bevel angle of the gears being correlated with the setting angle W. The gear 71b walks around the gear 70b when the hob head 50b is pivoted to change the center distance Y. Axial shifting of the hob 22b is permitted by virtue of a splined connection 85 between the drive shaft 72b and the hob spindle 23b. The splined connection tends to reduce the stiffness in the drive to the hob 22b.

Figure 8:
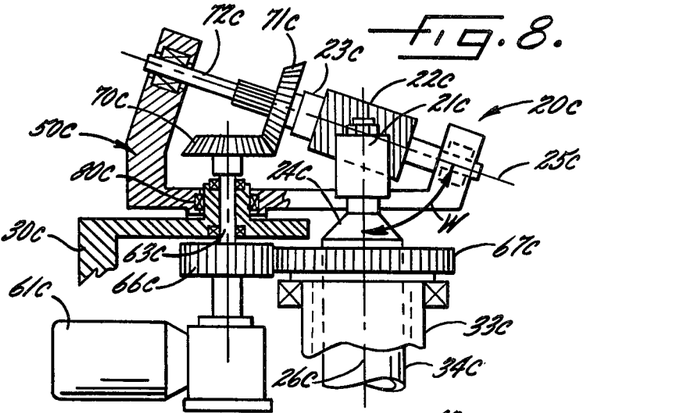
FIG. 8 is a view similar to FIG. 5 but shows a fourth embodiment of a hobbing machine of the invention.

Another machine 20c is shown schematically in FIG. 8 in which the drive shaft 63c extends parallel to the work spindle 24c and is driven by a motor 61c which acts through a speed reducer 86. Standard spur gears 66c and 67c or other types of parallel axis gears are coaxial with the shaft 63c and the work spindle 24c, respectively, to transmit rotation from the shaft to the spindle.

The hob drive shaft 72c is alined axially with the hob spindle 23c and is inclined relative to the work spindle 24c at the desired setting angle W. A bevel gear 70c on the upper end of the shaft 63c meshes with a bevel gear 71c on the shaft 72c to transmit rotation to the latter shaft. The hob head 50c is mounted by a bearing 80c to pivot about the axis of the drive shaft 63 to enable the center distance between the spindles 23 and 24c to be changed and, as an incident thereto, the gear 71c walks around the gear 70c.

Figure 9:
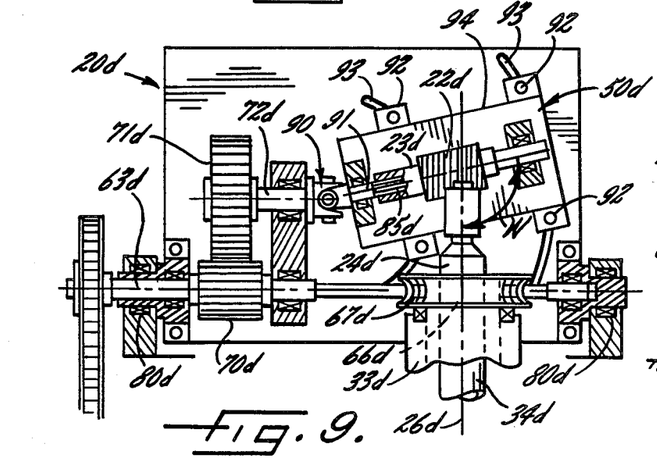
FIG. 9 is also a view similar to FIG. 5 but shows a fifth embodiment of a hobbing machine of the invention.
Figure 10:
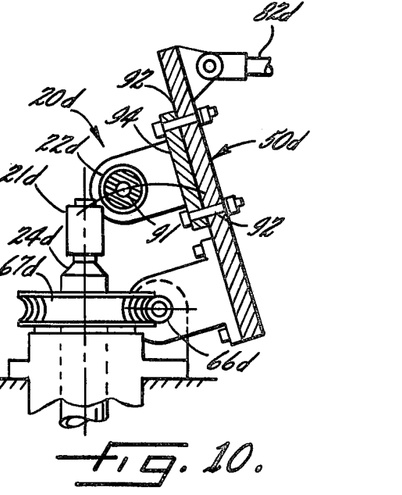
FIG. 10 is a fragmentary end elevational view of parts shown in FIG. 9.

The machine 20d shown in FIGS. 9 and 10 is characterized in that the setting angle W can be selectively changed and, in addition, all four gears 66d, 67d, 70d and 71d of the machine 20d are non-angled gears. As shown, a pinion 70d on the shaft 63d meshes with a bull gear 71d on the shaft 72d while a standard worm 66d on the shaft 63d meshes with a standard worm wheel 67d which is coaxial with the work spindle 24d. The hob head 50d is adapted to pivot about bearings 80d which are coaxial with the shaft 63d and, during such pivoting, the bull gear 71d walks around the pinion 70d.

To enable the setting angle W of the machine 20d to be established and selectively changed even though non-angled gears 66d, 67d, 70d and 71d are used, a constant velocity universal joint or coupling 90 (FIG. 9) is connected between the shaft 72d and a shaft 91 which is connected to and is alined axially with the hob spindle 23d. A splined connection 85d between the shaft 91 and the hob spindle 23d permits axial shifting of the hob 22d.

The shaft 91 and the hob spindle 23d are rotatably supported by a hob swivel plate 94. The latter is connected to the hob head 50d by bolts 92 which extend through a pair of arcuate slots 93 in the head. By loosening the bolts 92, the swivel plate 94 and hob 22d may be pivoted on the head 50d to change setting angle W, the universal joint 90 permitting the plate to pivot relative to the shaft 72d. Thus, the universal joint enables the setting angle to be selectively changed but does reduce the stiffness of the drive to the hob 22d.

Figure 11:
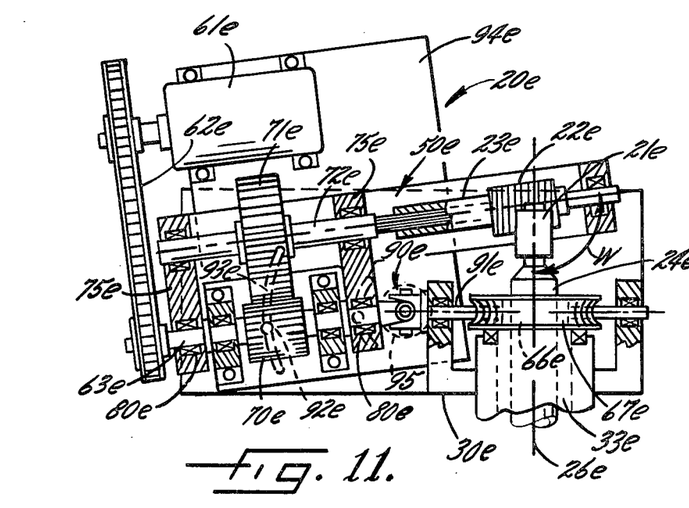
FIG. 11 is another view similar to FIG. 5 but shows a sixth embodiment of a hobbing machine of the invention.
Figure 12:
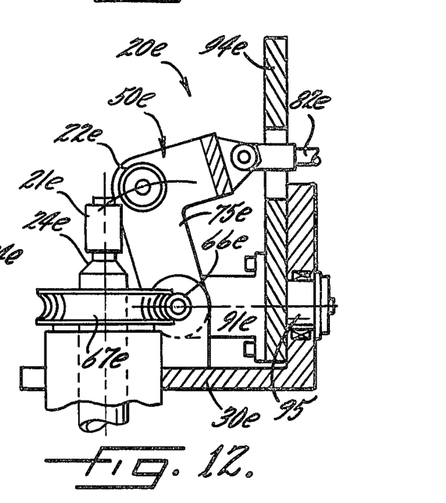
FIG. 12 is a fragmentary end elevational view of parts shown in FIG. 11.

The machine 20e shown schematically in FIGS. 11 and 12 is a variation of the machine 20d. In the machine 20e, a swivel plate 94e carries a motor 61e which is connected to the drive shaft 63e by way of a cogged belt 62e. The shaft 63e also is carried on the plate 94e and is connected to a parallel shaft 72e by a pinion 70e and a bull gear 71e which are coaxial with the shafts 63e and 72e, respectively. The shaft 72e and the hob spindle 23e are carried on a hob head 50e having arms 75e which are mounted by bearings 80e to pivot about the axis of the shaft 63e. When the head 50e is pivoted about the shaft 63e to change the center distance, the bull gear 71e walks around the pinion 70e.

As shown in FIG. 11, the shaft 63e is connected to a shaft 91e by a constant velocity universal coupling 90e. The shaft 91e extends perpendicular to the work spindle 24e and carries a conventional worm 66e (FIG. 12) which meshes with a conventional worm wheel 67e, the latter being coaxial with the work spindle 24e.

The swivel plate 94e is mounted on the frame 30e to swing about a horizontal pivot 95 (FIG. 12) which is alined with the universal joint 90e. The swivel plate 94e normally is held in a fixed position relative to the frame 30e by bolts 92e which extend through arcuate slots 93e in the plate. By loosening the bolts, the plate may be swung about the pivot 95, the hob head 50e and the hob 22e swinging in unison with the plate to enable the setting angle to be changed. The universal joint 90e permits the swivel plate to pivot relative to the work spindle 24e but tends to reduce the stiffness in the drive to that spindle.

We claim:

1. A hobbing machine comprising first and second drive shafts, a drive mechanism for rotating said first shaft, first and second coacting gears connected to said first and second shaft, respectively, for transmitting rotation of said first shaft to said second shaft, a rotatable work spindle adapted to carry a work blank for a spur or helical gear, a rotatable hob spindle adapted to carry a hob and extending transversely of said work spindle, said hob spindle being inclined relative to said work spindle at a predetermined setting angle which is other than a right angle, one of said shafts being a hob drive shaft and being connected to rotate said hob spindle, said hob drive shaft being axially alined with said hob spindle and being inclined relative to said work spindle at the same angle as said setting angle, a third gear connected to said work spindle, said third gear being a bevel gear, a fourth gear connected to the other of said shafts and coacting with said third gear to rotate said work spindle whereby said other shaft constitutes a work drive shaft, said fourth gear also being a bevel gear and having an axis which is inclined relative to the axis of said third gear at the same angle as said setting angle, and means mounting said hob spindle for selective pivoting toward and away from said work spindle without changing said setting angle, said hob drive shaft swinging about the axis of said work drive shaft during said pivoting with one of said first and second gears walking around the other of said first and second gears to permit such swinging.

2. A hobbing machine as defined in claim 1, in which said shafts have portions which extend parallel to one another, said first and second gears being mounted on the parallel portions of said first and second shafts, respectively.

3. A hobbing machine as defined in claim 1 further including means for moving said work spindle bodily along its own axis to feed the work blank relative to the hob, and means coupling said third gear to said work spindle to rotate said work spindle and to permit axial movement of said work spindle while permitting said third gear to remain in an axially stationary position.

4. A hobbing machine as defined in claim 3 in which said moving means comprise a reciprocating fluid-operated actuator.

5. A hobbing machine comprising a rotatable work spindle adapted to carry a work blank for a spur or helical gear, a rotatable hob spindle adapted to carry a hob and extending transversely of said work spindle, said hob spindle being inclined relative to said work spindle at a predetermined setting angle which is other than a right angle, a work drive shaft, a hob drive shaft extending parallel to said work drive shaft, said hob drive shaft being connected to and being alined axially with said hob spindle whereby both of said shafts are inclined relative to said work spindle at the same angle as said setting angle, a drive mechanism for rotating one of said drive shafts, first and second meshing gears on said work drive shaft and said hob drive shaft, respectively, for transmitting rotation of said one drive shaft to said other drive shaft, a worm wheel connected to said work spindle and having an axis coinciding with the axis of said work spindle, a worm connected to said work drive shaft and meshing with said worm wheel to transmit rotation of said work drive shaft to said work spindle, said worm having an axis coinciding with the axis of said work drive shaft whereby the axis of said worm is inclined relative to the axis of said worm wheel at the same angle as said setting angle, means mounting said hob spindle and said hob drive shaft for selective pivoting toward and away from said work spindle without changing said setting angle, said hob spindle and said hob drive shaft swinging about the axis of said work drive shaft during such pivoting with said second gear walking around said first gear to permit such swinging, means for moving said work spindle bodily along its own axis to feed the work blank relative to the hob, and means coupling said worm wheel to said work spindle to rotate said work spindle and to permit axial movement of said work spindle while permitting said worm wheel to remain in an axially stationary position.

6. A hobbing machine as defined in claim 5 in which said drive mechanism is connected to rotate said work drive shaft and remains stationary during pivoting of said hob drive shaft.

7. A hobbing machine as defined in claim 6 further including means for shifting said hob spindle bodily along its own axis, said second gear sliding axially along said first gear during axial shifting of said hob spindle.

8. A hobbing machine as defined in claim 5 in which said moving means comprise a reciprocating fluid-operated actuator.

9. A hobbing machine comprising a rotatable work spindle adapted to carry a work blank for a spur or helical gear, a rotatable hob spindle adapted to carry a hob and extending transversely of said work spindle, said hob spindle being inclined relative to said work spindle at a predetermined setting angle which is other than a right angle, a work drive shaft extending at a right angle to said work spindle, a hob drive shaft alined axially with and connected to rotate said hob spindle and being inclined relative to said work spindle at the same angle as said setting angle, a drive mechanism for rotating one of said shafts, first and second bevel gears on said work shaft and said hob shaft, respectively, for transmitting rotation of said one shaft to said other shaft, the axis of said second gear being inclined relative to the axis of said first gear at the same angle as said setting angle, a worm wheel connected to said work spindle, a worm connected to said work shaft and coacting with said worm wheel to rotate said work spindle, and means mounting said hob spindle and said hob drive shaft for selective pivoting toward and away from said work spindle without changing said setting angle, said hob spindle and said hob drive shaft swinging about the axis of said work drive shaft during such pivoting with said second gear walking around said first gear to permit such swinging.

10. A hobbing machine as defined in claim 9 in which said drive mechanism is connected to rotate said work drive shaft and remains stationary during pivoting of said hob drive shaft.

11. A hobbing machine as defined in claim 9 further including means for moving said work spindle bodily along its own axis to feed the work blank relative to the hob, and means coupling said worm wheel to said work spindle to rotate said work spindle and to permit axial movement of said work spindle while permitting said worm wheel to remain in an axially stationary position.

12. A hobbing machine as defined in claim 11 in which said moving means comprise a reciprocating fluid-operated actuator.

13. A hobbing machine comprising first and second drive shafts, a drive mechanism for rotating said first shaft, first and second coacting gears connected to said first and second shafts, respectively, for transmitting rotation of said first shaft to said second shaft, a rotatable work spindle adapted to carry a work blank for a spur or helical gear, a rotatable hob spindle adapted to carry a hob and extending transversely of said work spindle at a predetermined setting angle relative to said work spindle, said setting angle being other than a right angle, one of said shafts being a hob drive shaft and being connected to rotate said hob spindle, a third gear connected to said work spindle, a fourth gear connected to the other of said shafts and coacting with said third gear to rotate said work spindle whereby said other shaft constitutes a work drive shaft, one of said shafts having a first portion and having a second portion which is inclined relative to the first portion of such shaft at an angle which is correlated with said setting angle, a constant velocity universal coupling between the first and second portions of the latter shaft and permitting selective adjustment of the angularity between said first and second portions, and means mounting said hob spindle for selective pivoting toward and away from said work spindle without changing said setting angle, said hob drive shaft swinging about the axis of said work drive shaft during said pivoting with one of said first and second gears walking around the other of said first and second gears to permit such swinging.

14. A hobbing machine as defined in claim 13 in which both of said shafts have first portions which extend parallel to one another, said first and second gears being mounted on the parallel portions of said first and second shafts, respectively, the axis of said first gear extending parallel to the axis of said second gear, and the axis of said third gear extending perpendicular to the axis of said fourth gear.

15. A hobbing machine as defined in claim 14 in which the shaft having said first and second portions connected by said constant velocity universal coupling is said work drive shaft.

16. A hobbing machine as defined in claim 14 in which the shaft having said first and second portions connected by said constant velocity universal coupling is said hob drive shaft.

17. A hobbing machine comprising first and second drive shafts, a drive mechanism for rotating said first shaft, first and second coacting gears connected to said first and second shafts, respectively, for transmitting rotation of said first shaft to said second shaft, a rotatable work spindle adapted to carry a work blank for a spur or helical gear, a rotatable hob spindle adapted to carry a hob and extending transversely of said work spindle at a predetermined setting angle other than a right angle relative to said work spindle, one of said shafts being a hob drive shaft and being connected to rotate said hob spindle, a third gear connected to said work spindle, a fourth gear connected to the other of said shafts and coacting with said third gear to rotate said work spindle whereby said other shaft constitutes a work drive shaft, said shafts having portions which extend parallel to one another and which extend perpendicular to said work spindle, said first and second gears being mounted on the parallel portions of said first and second shafts, respectively, the axis of said first gear extending parallel to the axis of said second gear, the axis of said third gear extending perpendicular to the axis of said fourth gear, a constant velocity universal coupling between said hob spindle and that portion of the hob drive shaft that extends parallel to the work drive shaft, said universal coupling permitting selective adjustment of the angularity between said hob spindle and said last-mentioned shaft portion, and means mounting said hob spindle for selective pivoting toward and away from said work spindle without changing said setting angle, said hob drive shaft swinging about the axis of said work drive shaft during said pivoting with one of said first and second gears walking around the other of said first and second gears to permit such swinging.

18. A hobbing machine comprising first and second drive shafts, a drive mechanism for rotating said first shaft, first and second coacting gears connected to said first and second shafts, respectively, for transmitting rotating of said first shaft to said second shaft, a rotatable work spindle adapted to carry a work blank for a spur or helical gear, a rotatable hob spindle adapted to carry a hob and extending tansversely of said work spindle at a predetermined setting angle other than a right angle relative to said work spindle whereby said hob spindle is inclined relative to said work spindle, one of said shafts being a hob drive shaft and being connected to rotate said hob spindle, said hob drive shaft being axially alined with said hob spindle and being inclined relative to said work spindle at the same angle as said setting angle, a third gear connected to said work spindle, a fourth gear connected to the other of said shafts and coacting with said third gear to rotate said work spindle whereby said other shaft constitutes a work drive shaft, said work drive shaft having a first portion which extends parallel to said hob drive shaft, said first and second gears being mounted on the parallel portions of said shafts, the axis of said first gear extending parallel to the axis of said second gear, the axis of said third gear extending perpendicular to the axis of said fourth gear, said work drive shaft having a second portion which is inclined relative to the first portion of such shaft at an angle which is correlated with said setting angle, a constant velocity universal coupling between the first and second portions of said work drive shaft and permitting selective adjustment of the angularity between the first and second portions of said work drive shaft, and means mounting said hob spindle for selective pivoting toward and away from said work spindle without changing said setting angle, said hob drive shaft swinging about the axis of said work drive shaft during said pivoting with one of said first and second gears walking around the other of said first and second gears to permit such swinging.

* * * * *